(12) United States Patent
Jin (10) Patent No.: US 9,694,920 B2
(45) Date of Patent: Jul. 4, 2017

(54) TOILET USED IN OUTER SPACE

(75) Inventor: Xu Kai Jin, Beijing (CN)

(73) Assignee: Lili He, Shenzhen, Guangdong (CN)

( * ) Notice: Subject to any disclaimer, the term of this patent is extended or adjusted under 35 U.S.C. 154(b) by 345 days.

(21) Appl. No.: 12/738,009

(22) PCT Filed: Aug. 26, 2009

(86) PCT No.: PCT/CN2009/073550
§ 371 (c)(1),
(2), (4) Date: Apr. 14, 2010

(87) PCT Pub. No.: WO2010/022659
PCT Pub. Date: Mar. 4, 2010

(65) Prior Publication Data
US 2011/0138528 A1    Jun. 16, 2011

(30) Foreign Application Priority Data

Aug. 27, 2008  (CN) .......................... 2008 1 0198036

(51) Int. Cl.
*B64D 11/02* (2006.01)
*B64G 1/60* (2006.01)
*A47K 11/02* (2006.01)

(52) U.S. Cl.
CPC ............... *B64G 1/60* (2013.01); *A47K 11/02* (2013.01)

(58) Field of Classification Search
USPC ...................................... 4/316, 315, 319, 300
See application file for complete search history.

(56) References Cited

U.S. PATENT DOCUMENTS

| | | | | |
|---|---|---|---|---|
| 3,329,974 | A | * | 7/1967 | Belasco et al. ................... 4/316 |
| 4,791,688 | A | * | 12/1988 | Krishnakumar et al. ......... 4/319 |
| 4,955,090 | A | * | 9/1990 | Stefan .............................. 4/316 |
| 2005/0039249 | A1 | * | 2/2005 | Maercovich et al. ............ 4/313 |
| 2005/0071914 | A1 | * | 4/2005 | Marshall ................... E03D 3/00 4/427 |
| 2010/0083433 | A1 | * | 4/2010 | Pondelick et al. ................ 4/316 |

* cited by examiner

*Primary Examiner* — Lauren Crane (57) ABSTRACT

A toilet used in outer space comprises a housing, a gathering system and a collecting system installed in the housing, wherein the gathering system is an electric feeding mechanism with a conveying channel, a spiral shaft, an inlet member fitted to the conveying channel, and an outlet member formed on the conveying channel, the spiral shaft is placed in the conveying channel to move axially relative to the conveying channel, and includes a cleaner located below the conveying channel and inserting through the conveying channel having a sleeve member fitted to an output gear thereof, and the sleeve member actuates the spiral shaft to rotate via a pillar and includes a tab disposed on an inner wall thereof to correspond to the spiral groove, between the pillar and the conveying channel is defined a compression spring; the gathering system being connected to the outlet member.

16 Claims, 13 Drawing Sheets

TOILET USED IN OUTER SPACE

BACKGROUND OF THE INVENTION

Field of the Invention

The present invention relates to a toilet used in outer space that can gather feces in a floating zero-gravity environment.

Description of the Prior Art

Exploring in the space is a dream for human. In recent 50 years, people try developed various spacecrafts to explore the space. For example, on Oct. 4, 1957, the Russian Federation launched the first artificial satellite to the space, and on Apr. 12, 1961, the first spacecrafts carrying astronauts to explore the space, and on Mar. 18, 1965, a Russian astronaut walks outside the spacecraft cabinet, and on Jul. 20, 1069, American astronauts walks on the moon first.

On Oct. 15, 2003, the Shenzhou V spacecraft was launched to the space to carry the astronaut to the space, and on Oct. 12, 2005, the Shenzhou VI spacecraft was launched to the space successfully, therefore China is the third country in the world that can develop aerospace industry to explore the space.

However, how to solve feces draining problems during exploring the space is still a difficulty. Theses problems includes the toilet installed in the spacecraft is expensive, larger-sized, operation complicated, energy consuming. For example, during 11 times of accidents in American spacecraft, the toilet was broken 10 times to influence safety of the spacecraft. Therefore, feces draining problem of the spacecraft has to be overcome by people early.

Conventional feces draining method is to apply air drawing and guiding principle to drain feces and guide it into a bag. However, such a draining method includes the draining structure is complex, large, and under a zero-gravity condition, people can not drain feces to the toilet precisely. Furthermore, conventional solution to constipated problem includes inserting a finger or an object to the anus to dig feces or feeding chemical agent to facilitate fences drain, but such methods will injure the anus.

The present invention has arisen to mitigate and/or obviate the afore-described disadvantages.

SUMMARY OF THE INVENTION

The primary object of the present invention is to provide a toilet used in outer space that can gather feces in a floating zero-gravity environment.

Another object of the present invention is to provide a gathering system that can drain feces easily under constipation condition.

A toilet used in outer space in accordance with a preferred embodiment of the present invention comprises:

a housing, a gathering system and a collecting system, both of which are installed in the housing, the gathering system being an electric feeding mechanism with a conveying channel, a spiral shaft, an inlet member fitted to the conveying channel, and an outlet member formed on a side wall of the conveying channel, wherein the spiral shaft is placed in the conveying channel to move axially relative to the conveying channel, and includes a cleaner located below the conveying channel and inserting through a speed-lowering gear box of the conveying channel, the gear box of the conveying channel includes a sleeve member fitted to an output gear thereof, and the sleeve member actuates the spiral shaft to rotate via a pillar, one end of which is a hexagonal head to match with a hexagonal hole of the spiral shaft, and another end of which includes a spiral groove arranged thereon, the sleeve member includes a tab disposed on an inner wall thereof to correspond to the spiral groove, between the pillar and the conveying channel is defined a compression spring; the gathering system being connected to the outlet member;

A gathering system in accordance with a preferred embodiment of the present invention comprises:

a guiding cylinder, a speed decreasing machine, a speed decreasing machine, a control panel, a switch, and a power source, wherein the guiding cylinder includes an inlet member and an outlet member disposed thereon, includes a spiral peg placed therein, and a rear end of the spiral peg is connected to the speed decreasing machine via a power connector, the speed decreasing machine is coupled to the power source through the switch, and the switch is fixed to the control panel.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 1-12, a toilet used in outer space according to a preferred embodiment of the present invention comprises a housing 1, a gathering system and a collecting system, both of which are installed in the housing 1, and the housing 1 is comprised of a base 30, a front cover 31 and a rear cover 32, both of which are disposed on a top end of the base 30 to cover the gathering and the collecting systems.

Figure 1:
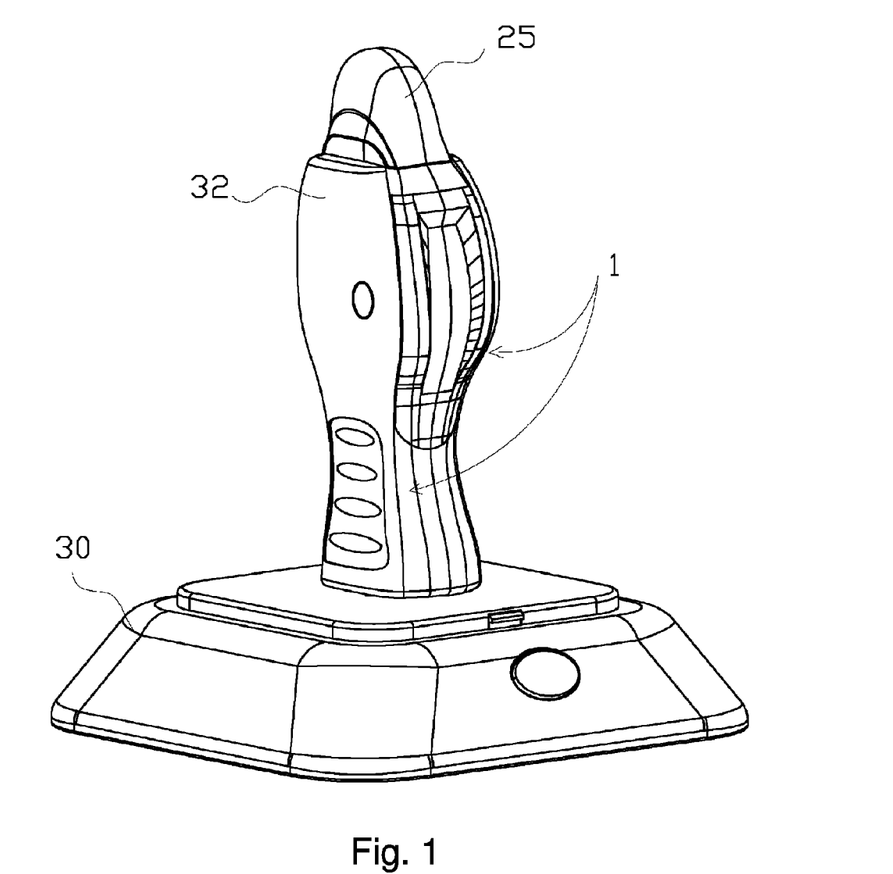
FIG. 1 is a perspective view showing the assembly of a toilet used in outer space according to a preferred embodiment of the present invention.
Figure 2:
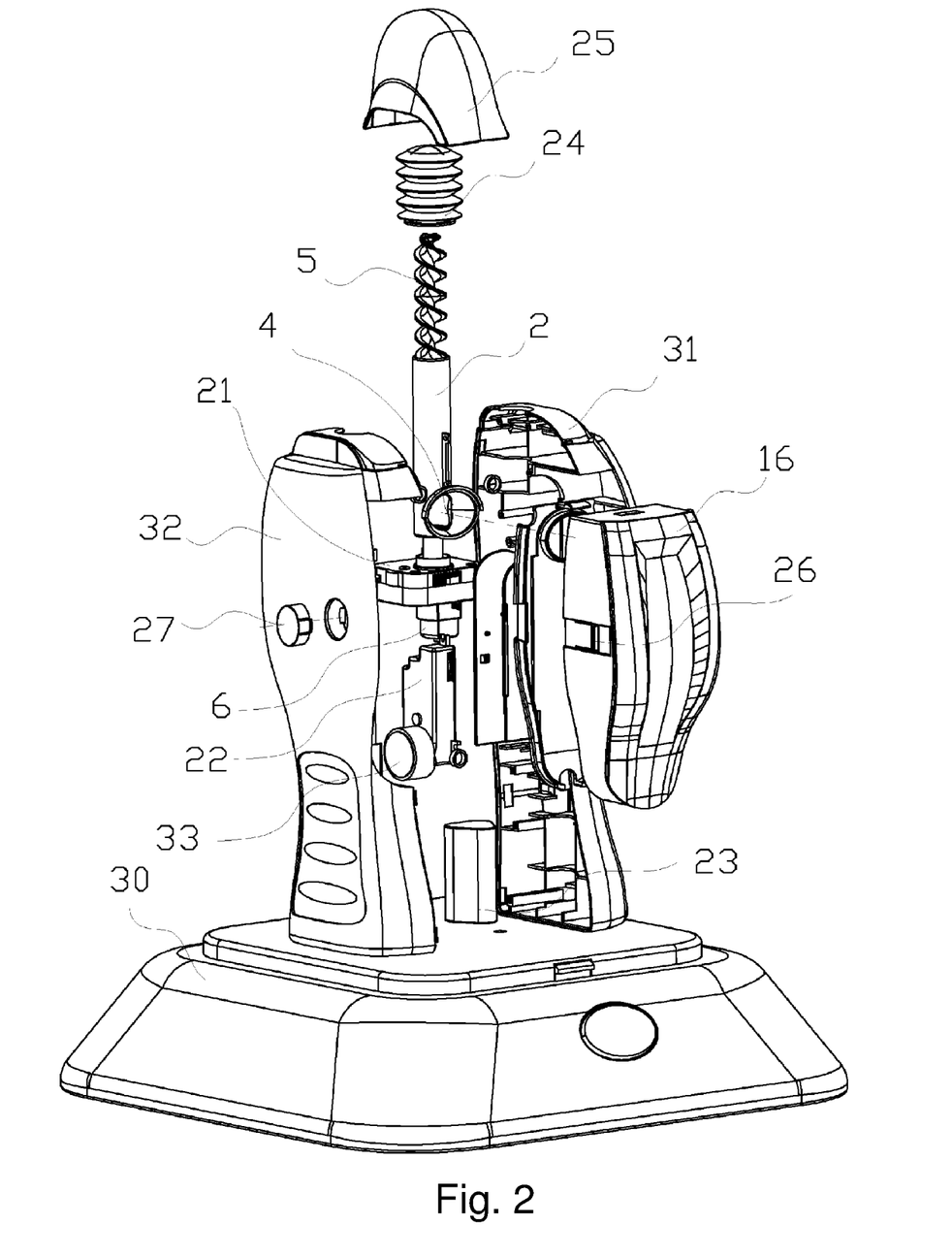
FIG. 2 is a perspective view showing the exploded components of the toilet used in outer space according to the preferred embodiment of the present invention.
Figure 3:
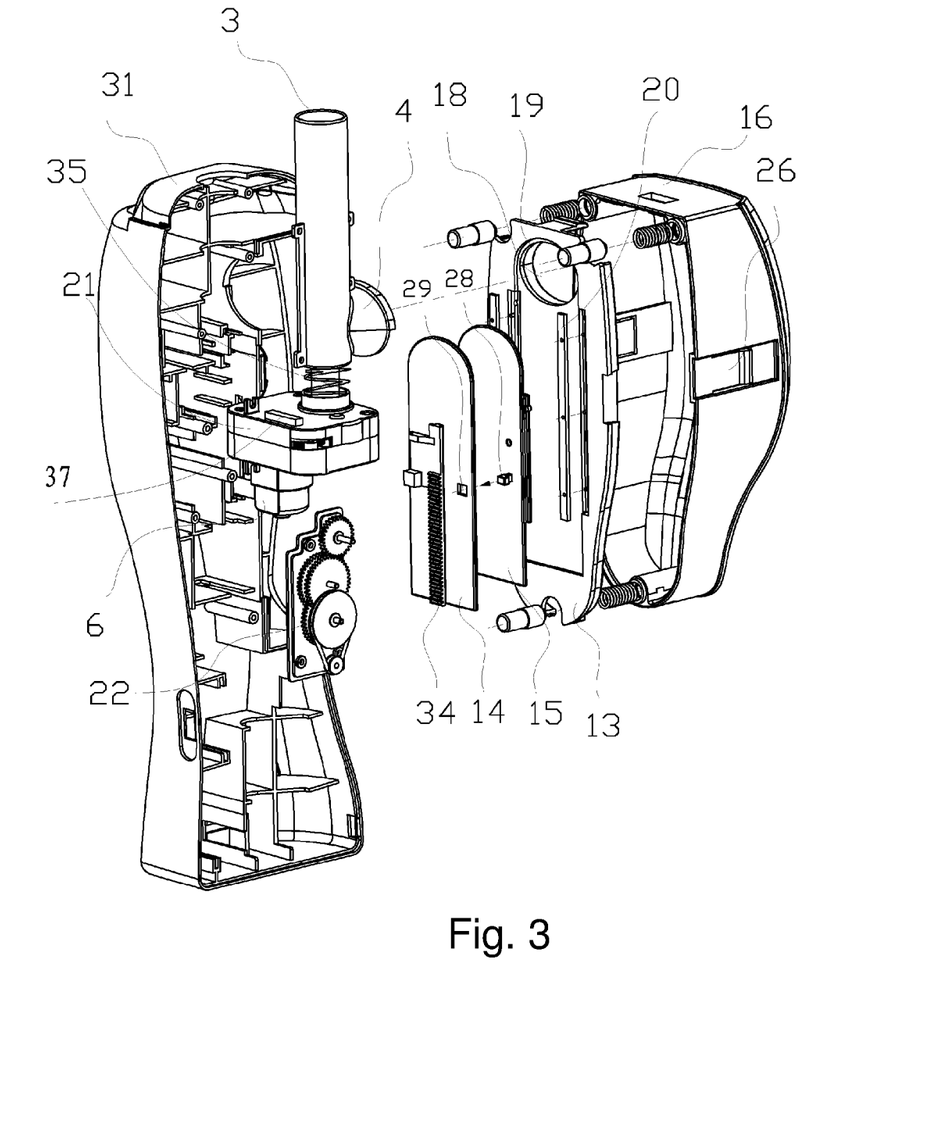
FIG. 3 is another perspective view showing the exploded components of the toilet used in outer space according to the preferred embodiment of the present invention.
Figure 4:
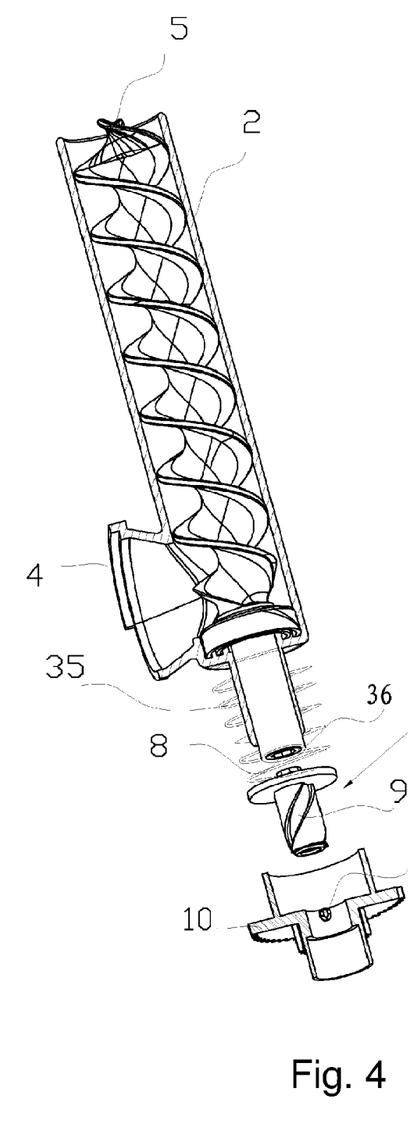
FIG. 4 is a cross sectional view showing a gathering system of the toilet used in outer space according to the preferred embodiment of the present invention.

As shown in FIGS. 2-4, the gathering system is an electric feeding mechanism with a conveying channel 2, a double-head spiral shaft 5, an inlet member 3 fitted to the conveying channel 2, and covered front and rear covers 31, 32 includes a top lid 25 disposed on a top end thereof to cover the inlet member 3, and an outlet member 4 formed on a side wall of the conveying channel 2, wherein the spiral shaft 5 includes a neck attached on a power input end thereof to move the spiral shaft 5 in the conveying channel 2 as illustrated in FIG. 4. A cleaner 6 is located below the conveying channel 2 and inserts through a speed-lowering gear box of the conveying channel 2 as shown in FIGS. 2, 3, 8, and 9, the gear box of the conveying channel 2 includes a sleeve member 10 fitted to an output gear thereof, and the sleeve member 10 actuates the spiral shaft 5 to rotate via a pillar 7, one end of which is a hexagonal head to match with a hexagonal hole 8 of the spiral shaft 5, and another end of which includes a spiral groove 9 arranged thereon, the sleeve member 10 includes a tab 11 disposed on an inner wall thereof to correspond to the spiral groove 9, between the pillar 7 and the conveying channel 2 is defined a compression spring 35 as shown in FIG. 4.

Figure 5:
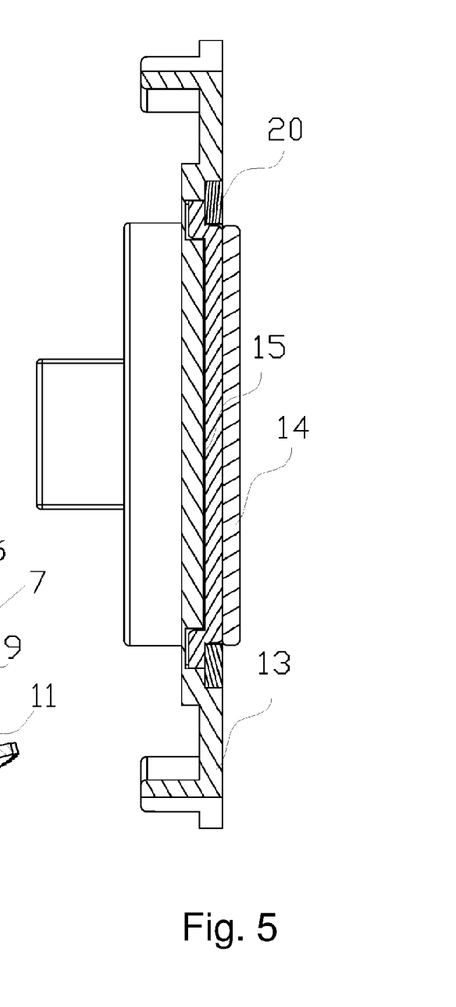
FIG. 5 is a cross sectional view showing the operation of the toilet used in outer space according to the preferred embodiment of the present invention.
Figure 6:
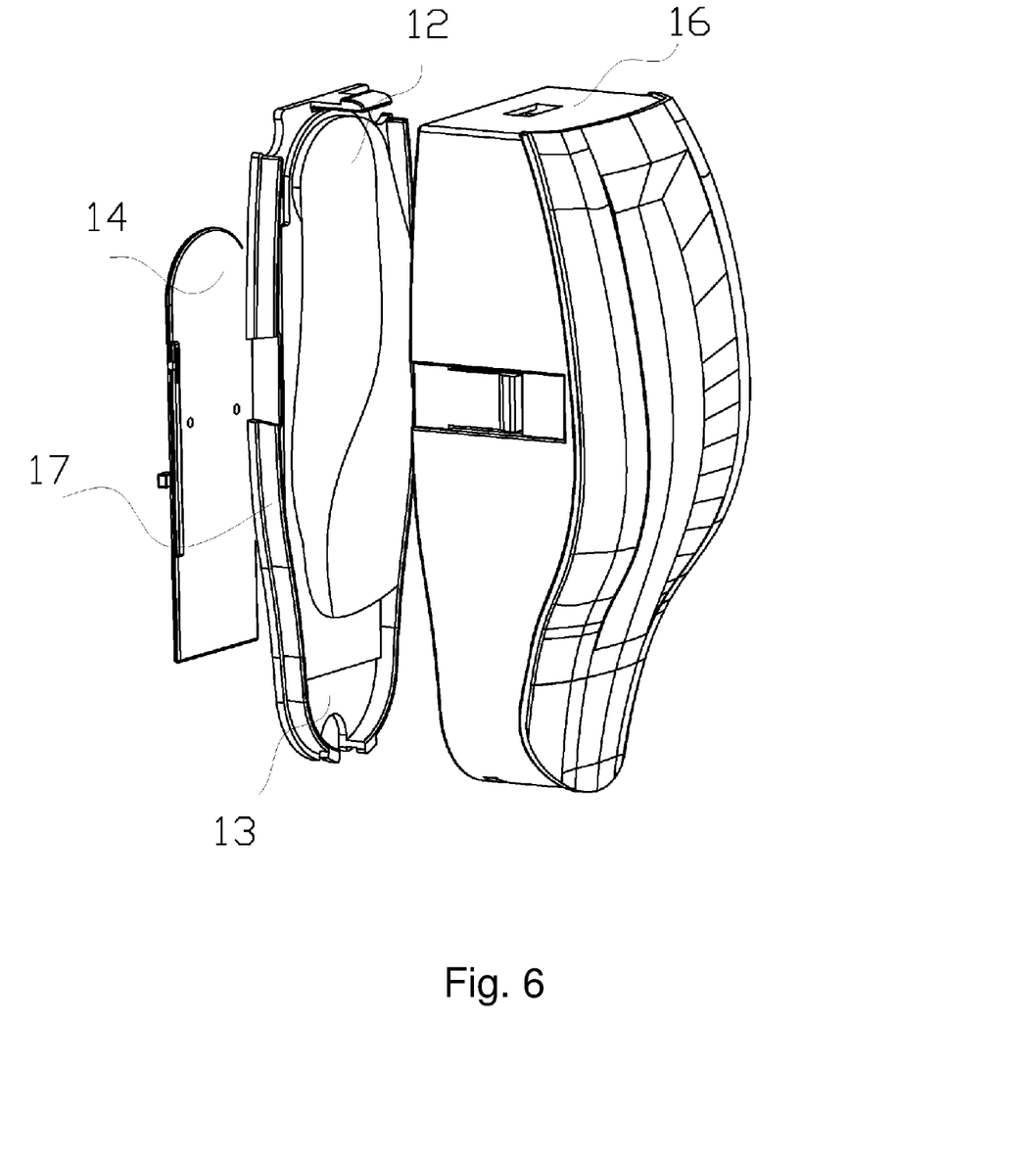
FIG. 6 is another perspective view showing the exploded components of the toilet used in outer space according to the preferred embodiment of the present invention.
Figure 7:
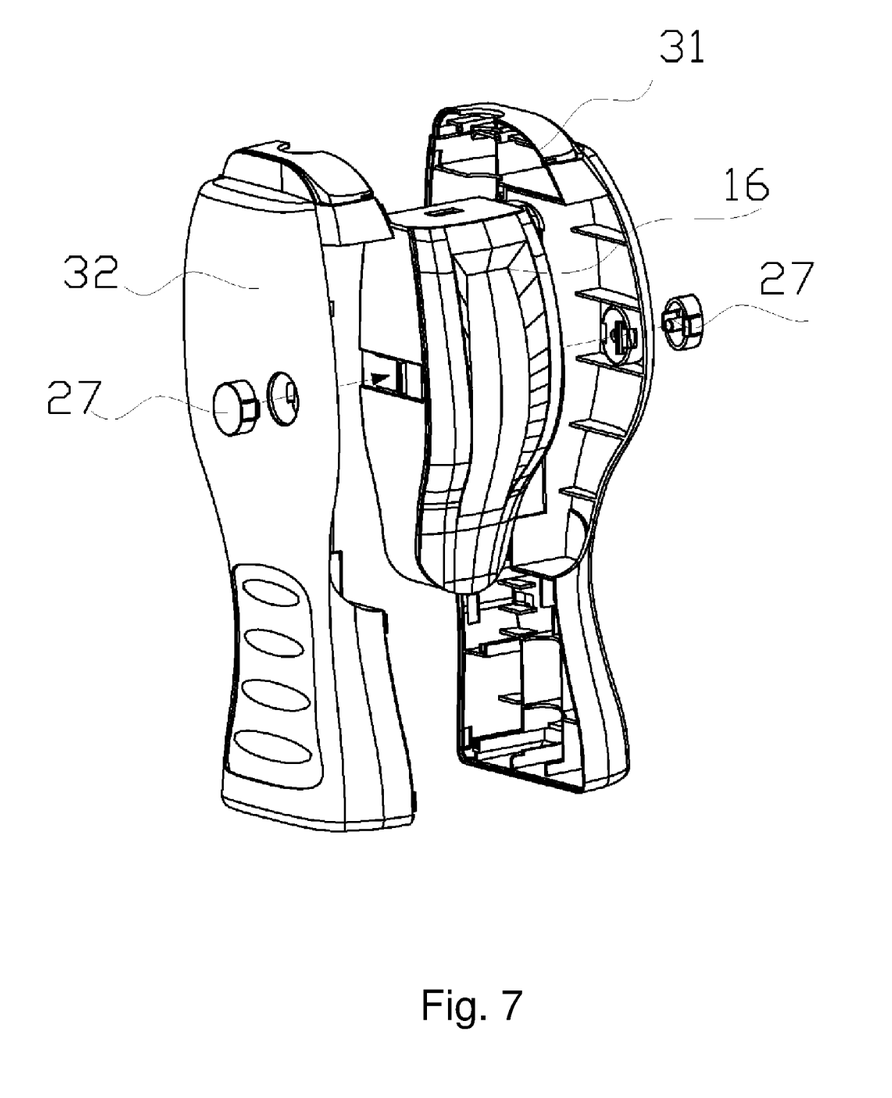
FIG. 7 is another perspective view showing the exploded components of the toilet used in outer space according to the preferred embodiment of the present invention.
Figure 8:
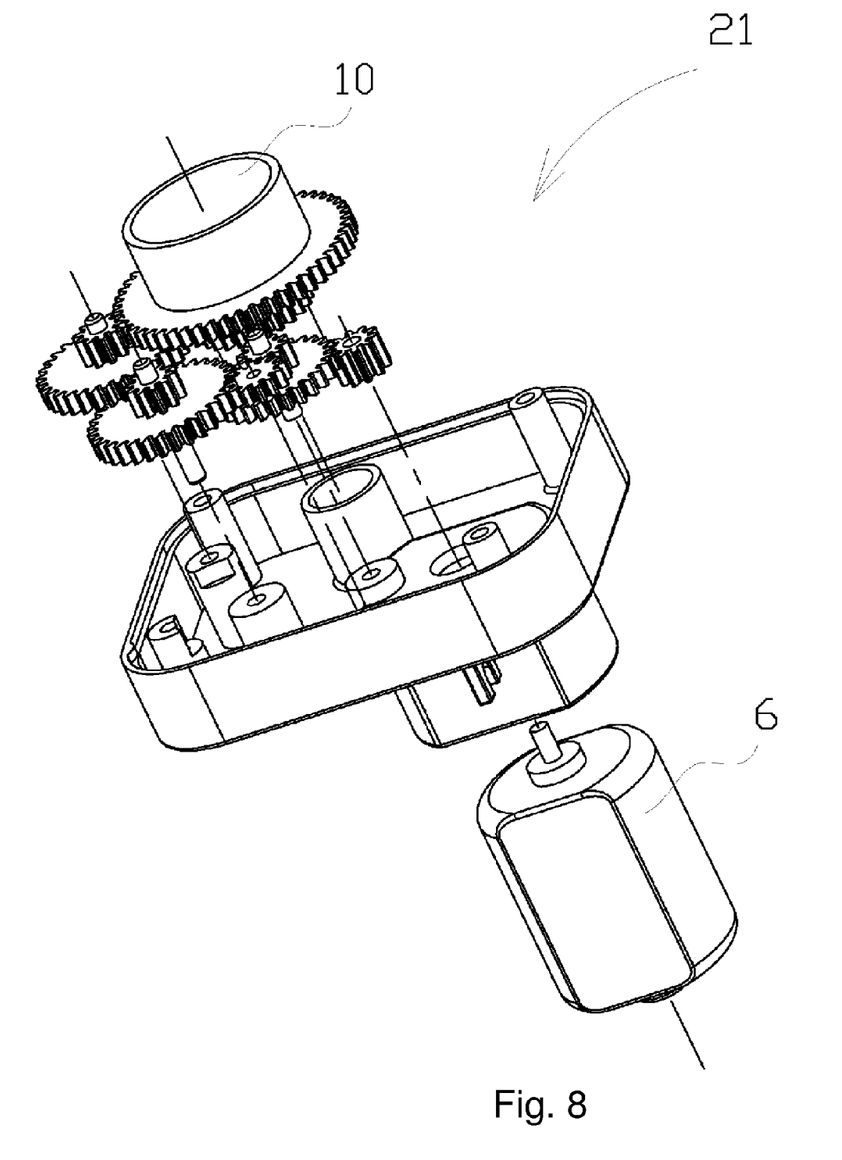
FIG. 8 is a perspective view showing the exploded components of a gathering system of the toilet used in outer space in accordance with the preferred embodiment of the present invention.
Figure 9:
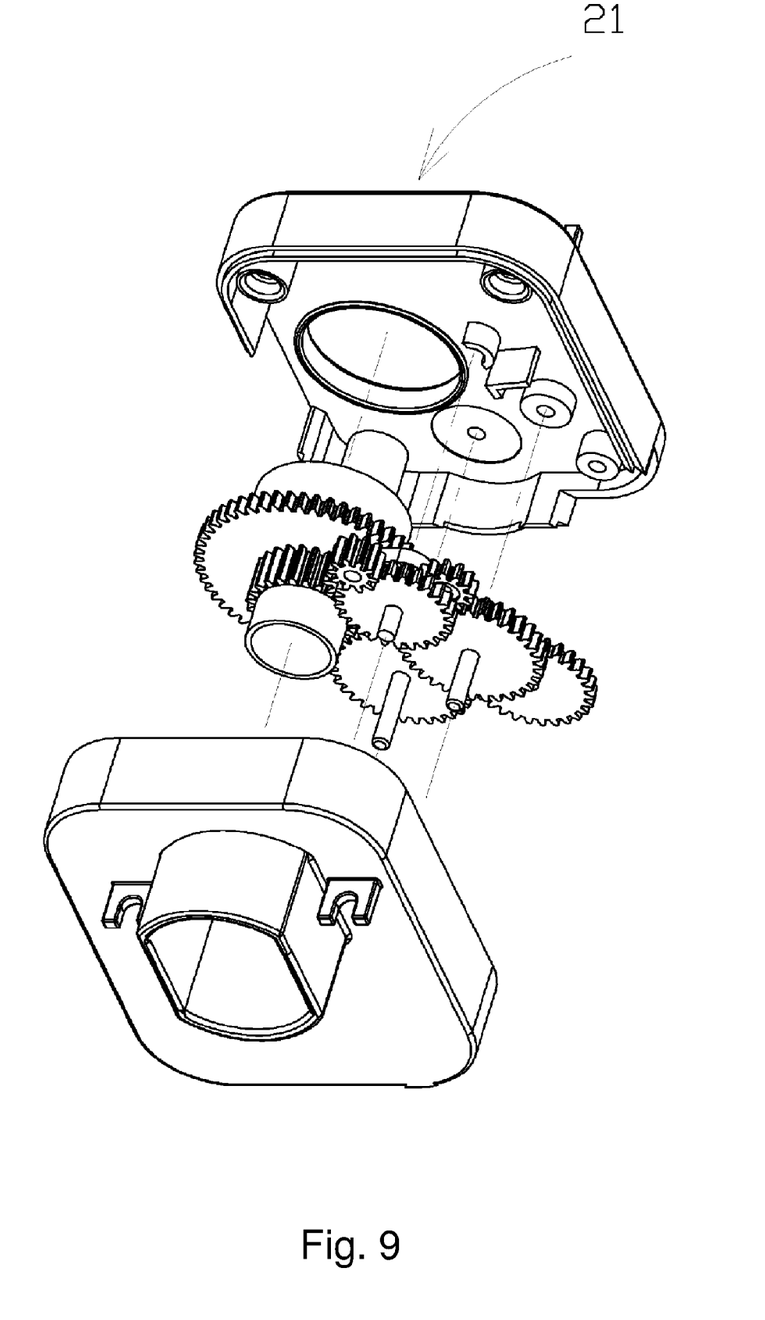
FIG. 9 is another perspective view showing the exploded components of the gathering system of the toilet used in outer space in accordance with the preferred embodiment of the present invention.
Figure 10:
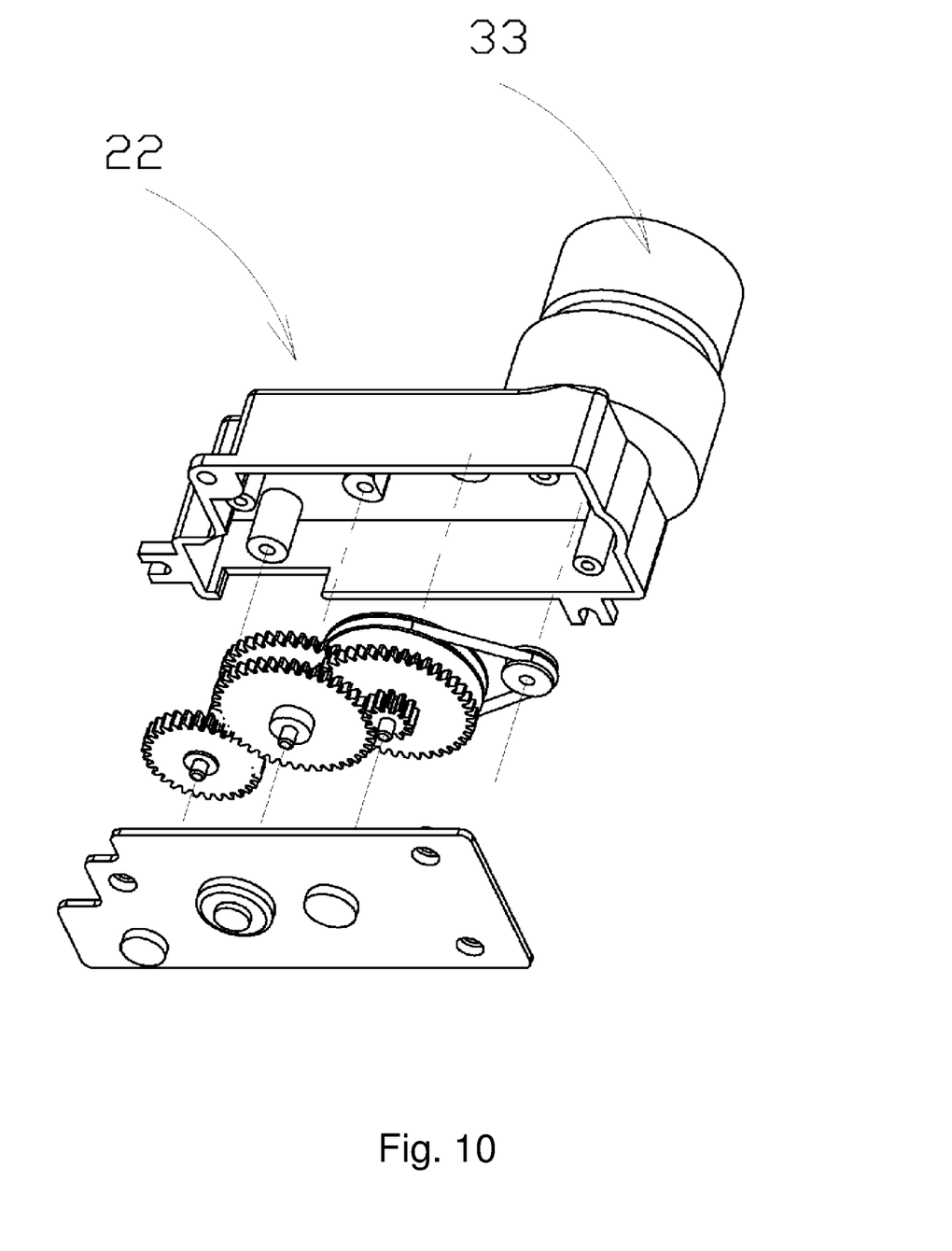
FIG. 10 is a perspective view showing the exploded components of a collecting system of the toilet used in outer space in accordance with the preferred embodiment of the present invention.
Figure 11:
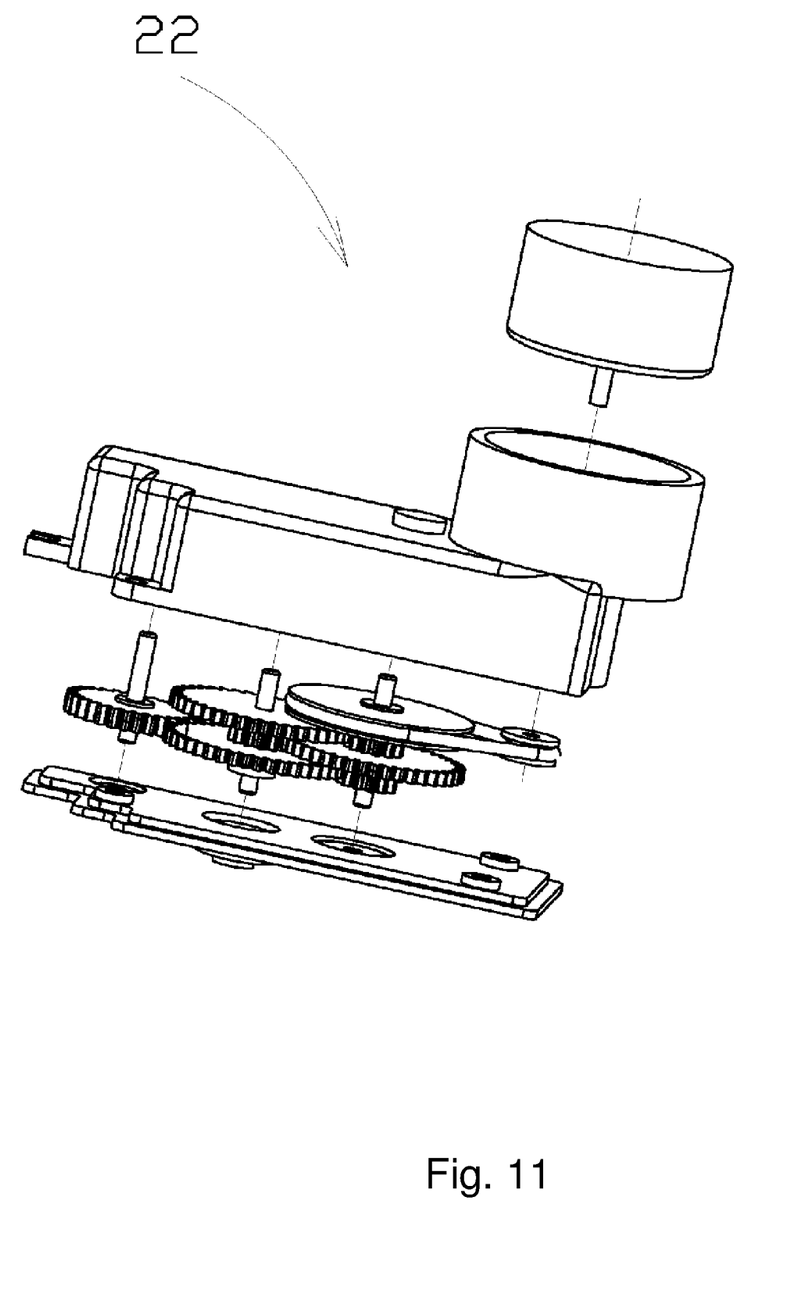
FIG. 11 is another perspective view showing the exploded components of the collecting system of the toilet used in outer space in accordance with the preferred embodiment of the present invention.
Figure 12:
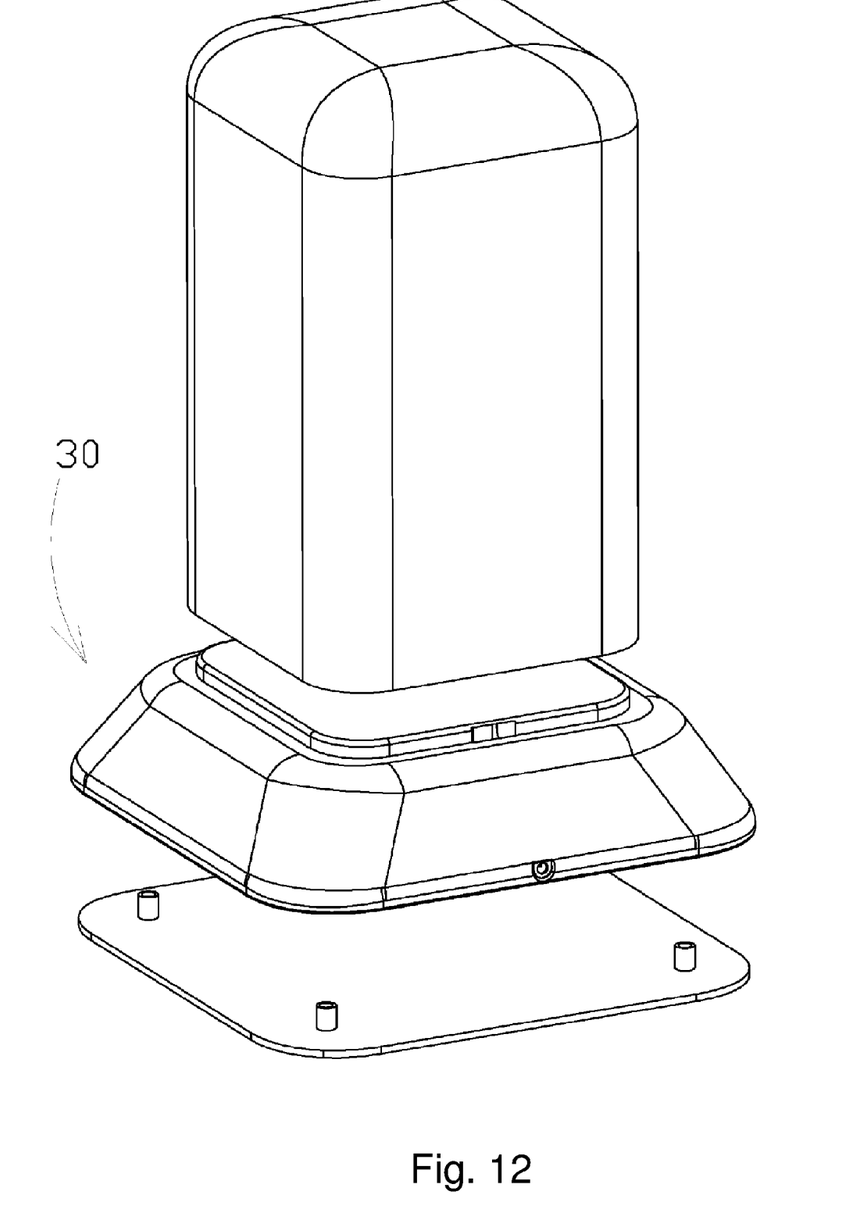
FIG. 12 is a perspective view showing the assembly of a base of the toilet used in outer space in accordance with the preferred embodiment of the present invention.
Figure 13:
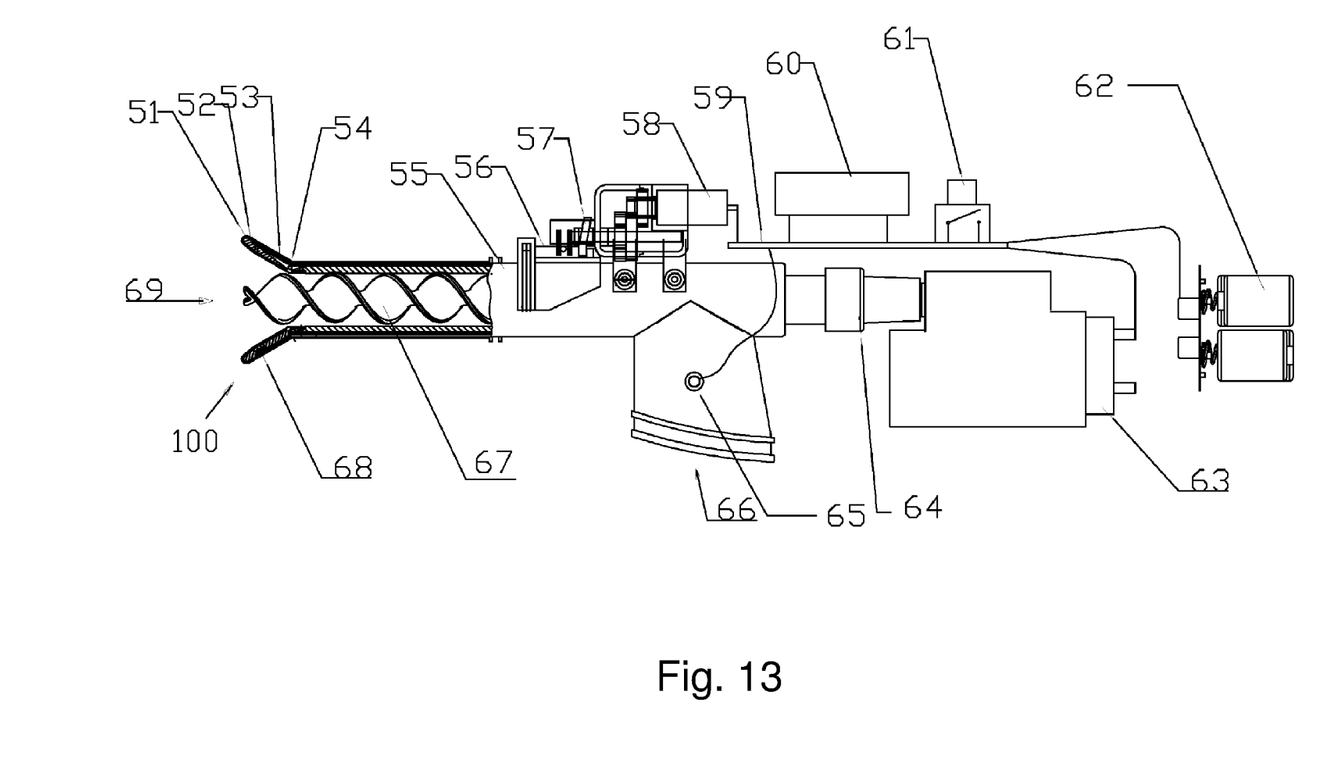
FIG. 13 is a sketch view of the gathering system of the toilet used in outer space in accordance with the preferred embodiment of the present invention.
Figure 14:
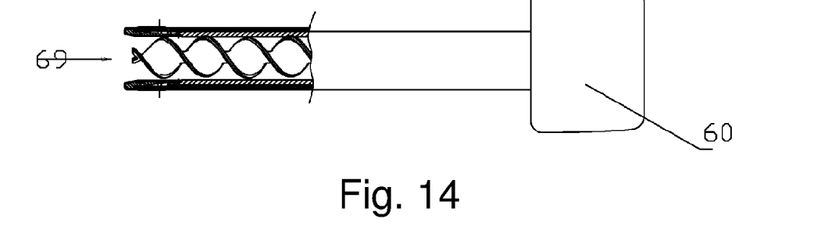
FIG. 14 is a partial enlarged view of FIG. 13.
Figure 15:
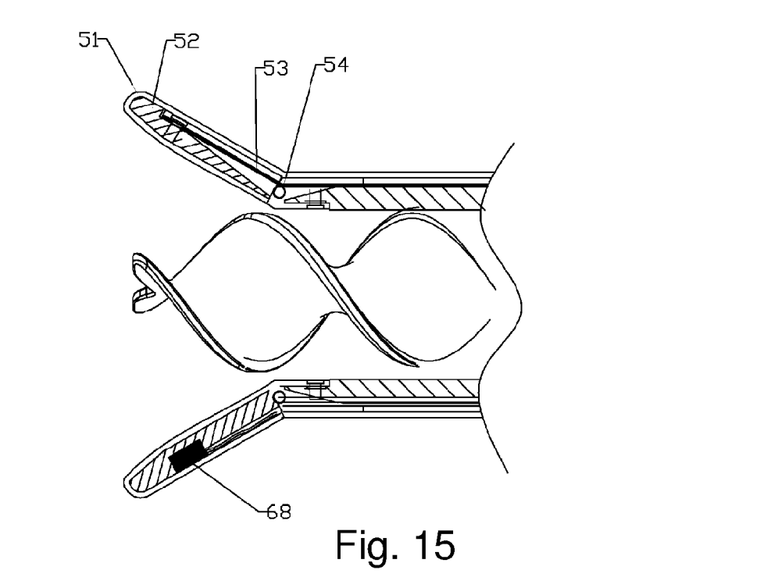
FIG. 15 is a partial enlarged view of FIG. 14.
Figure 16:
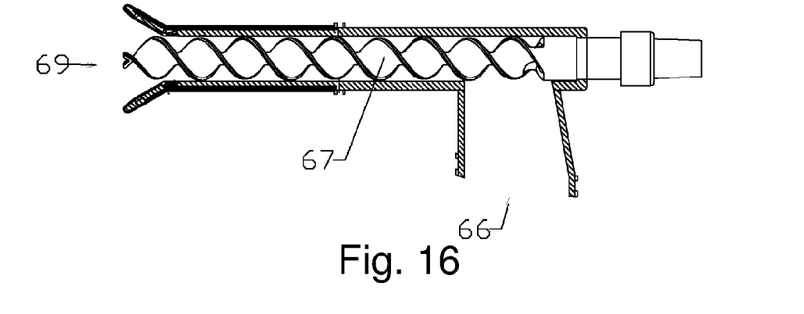
FIG. 16 is sectional view of a guiding cylinder as shown in FIG. 13.

The collecting system as illustrated in FIGS. 2, 3, and 6 comprises a bag 12, a holding plate 13, an open and close member 14, a connecting piece 15, a case 16, and a driving mechanism 17, wherein the holding plate 13 is disposed in the front and the rear covers 31, 32 of the housing 1 and includes an aperture 18 mounted thereon to correspond to the outlet member 4, and an annular ring 19 fixed around the aperture 18 to fit a bag 12 for collecting feces as illustrated in FIG. 6. With reference to FIGS. 2, 3, and 5, the holding plate 13 includes two parallel straps 20 attached on two sides thereof respectively to assemble and remove the open and close member 14 to and from connecting piece 15, the connecting piece 15 is retained between the open and close member 14 and the holding plate 13, and includes a raised resilient retainer 28 mounted on a surface thereof facing to a square orifice 29 of the open and close member 14 so that the resilient retainer 28 engages with the square orifice 29 of the open and close member 14, hence the connecting piece 15 is removed easily, and the open and close member 14 actuates the connecting piece 15 to move vertically, the assembled open and close member 14 and the connecting piece 15 are placed in a slot of the holding plate 13, the straps 20 are fixed along two sides of the slot to limit the assembled open and close member 14 and the connecting piece 15 disengage from the slot. It is to be noted that the assembled open and close member 14 and the connecting piece 15 can be placed to the holding plate 13, and the straps 20 are changed to angular irons as well.

With reference to FIGS. 2, 3, 10, and 11, the driving mechanism 17 includes an electric machine 33 to lower speed of the speed-lowering gear box, and the speed-lowering gear box includes an output gear, an input gear, and a rack 34 installed therein, and the rack 34 is attached to an outer side surface of the open and close member 14. The case 16 includes two elastic fasteners 26 retained on two sides thereof individually, and the front and rear covers 31, 32 include two releasers 27 disposed thereon to remove the case 16, and then the case 16 is retained to the housing 1 to cover the holding plate 13 and the bag 12, the holing plate 13 includes locking elements mounted on a top and a bottom surfaces thereof to engage with the case 16, and the connecting piece 15 is fixed in the slot of the holding plate 13 to move along the holding plate 13 vertically.

A clamping controlling system includes a pressure sensor 36 and a control chip 37, the pressure sensor 36, the control chip 37, and the cleaner 6 are electrically connected with a control line. For example, the pressure sensor 36 is disposed on a bottom end of the spiral shaft 5 of the electric feeding mechanism to sense a pressure of the feces to the spiral shaft 5, and the control chip 37 is installed to a speed-lowering gear box 21 of the cleaner 6.

At least one cell 23 is used to supply power to the cleaner 6 and the electric machine.

A double spiral cutting head is pushed by a spring 35 to move forward to 3 mm of distance close to the gathering system, and then the spring 35 returns to its original position during cleaning process, wherein an inlet member is inserted to user's draining organ, and the gathering system is started so that when the pressure sensor or a strain sensor of the damping controlling system senses the pressure of the feces, a temperature signal is transmitted to the control chip so that the cleaner pushes a double spiral rod out of the conveying channel 2 for 5-6 mm to dig feces, and then the double spiral rod presses the feces into the bag. Thereafter, the user presses a first button to closes the gathering system to remove the bag and put it into a container. The gathering system includes an automatic sealing device, the bag and a collection magazine, wherein the bag is made of biological charring materials to attach moisture and foul substances in the feces.

Thereafter, the open and close member is driven by gears to actuate the connecting piece to move upward to close the outlet member, and the connecting piece closes the inlet member. In addition, the removing member is pressed so that the case is actuated by the spring to actuate the holding plate and the connecting piece to bounce out of a body of the toilet, thereby taking the bag outward by hands.

During cleaning process, a second button of the housing is pressed so that the spiral shaft rotates reversely at high speed (about 100 circles/per min during working process, and 3000-4000 circles/per min during cleaning process), and water flows inward from the outlet member and flows outward to the inlet member. As shown in FIGS. 13-16, the gathering system is used to dig solid feces in the rectum automatically and allows to prevent the rectum from being expanded, and is provided with temperature detecting, feces testing, LCD display, and tested result displaying functions, wherein the guiding cylinder 55 includes an expanding and retracting mechanism 100, and the expanding and retracting mechanism 100 is comprised of a guiding cylinder 55, a spiral peg 67, a speed decreasing machine 63, a power connector 64, a power source 62, a switch 61, an expanding machine 58, a cam 57, an extending and retracting member 52, a silica gel film 51, a steel sheet 53, a joint 56, a turning shank 54, a thermally sensitive resistance 68, a color sensor 65, a control panel 59 with a control chip, a LCD display screen 60, the guiding cylinder 55 includes an inlet member 69 and an outlet member 66 disposed thereon, includes the expanding and retracting member 52 and the thermally sensitive resistance 68 mounted on a front end thereof, includes the color sensor 65 fixed on a rear end thereof, the spiral peg 67 is placed in the guiding cylinder 55, and the thermally sensitive resistance 68, the color sensor 65, the LCD display screen 60 and the control panel 59 are connected together.

In operation, the inlet member 69 of the guiding cylinder 55 is inserted to the anus, and the outlet member 66 is fitted to a bag, the switch 61 is turned on so that the speed decreasing machine 63 actuates the spiral peg 67 to rotate to dig feces, and the expanding machine 58 is driven by the cam 57 to actuate the steel sheet 53 to move reciprocately so that the extending and retracting member 52 moves, and the thermally sensitive resistance 68 senses the temperature in the anus and transmits a temperature signal to be shown in the LCD display screen 60 by using the control panel 59. Thereafter, the color sensor 65 tests the feces and a tested signal is transmitted to the control panel 59 to be analyzed by an integral circuit, the analyzed result is shown in LCD display screen 60. Furthermore, the LCD display screen 60 displays a state of the extending and retracting member 52, continuous working time, power amount, and the dug feces is guided out of the outlet member 66 through the guiding cylinder 55. To prevent the extending and retracting member 52 from injuring the anus and the intestines, the silica gel film 51 is wrapped to the extending and retracting member 52. Moreover, the toilet shows its waiting date and time.

The switch 61 is pressed to conduct power, and the speed decreasing machine 63 actuates the spiral peg 67 to rotate by ways of the power connector 64, and the expanding machine 58 is started to actuate the joint 56 and the steel sheet 53 to move reciprocately via the cam 57 so that the extending and retracting member 52 is actuated to move continuously to press and hold feces tightly such that the spiral peg 67 contacts and digs feces well in the inlet member 69, and the state of the extending and retracting member 52 is displayed in the LCD display screen 60. Moreover, the thermally sensitive resistance 68 measures the temperature in the anus and then the measured temperature is shown in the LCD display screen 60, the color sensor 65 distinguishes the color of feces when the dug feces passes though the guiding cylinder 55, and then a color signal is processed by the control panel 59 to distinguish user's health status. The feces are guided by the spiral peg 67 to drain out of the outlet member 66 via the guiding cylinder 55. While we have shown and described various embodiments in accordance with the present invention, it is clear to those skilled in the art that further embodiments may be made without departing from the scope of the present invention.

What is claimed is:

1. A toilet used in outer space comprising
a housing (1), a gathering system and a collecting system, both of which are installed in the housing (1), the gathering system being an electric feeding mechanism with a conveying channel (2), a spiral shaft (5), an inlet member (3) fitted to the conveying channel (2), and an outlet member (4) formed on a side wall of the conveying channel (2), wherein the inlet member (3) extends out of the housing (1) for being inserted into an anus of a user; the spiral shaft (5) is placed in the conveying channel (2) to move axially relative to the conveying channel (2), in such a manner that when the inlet member (3) is inserted into the anus, the spiral shaft (5) moves out of the conveying channel (2) by 5-6 mm for gathering feces in rectum; and includes a cleaner (6) located below the conveying channel (2) and inserting through a speed-lowering gear box of the conveying channel (2), the gear box of the conveying channel (2) includes a sleeve member (10) fitted to an output gear thereof, and the sleeve member (10) actuates the spiral shaft (5) to rotate via a pillar (7), one end of which is a hexagonal head to match with a hexagonal hole (8) of the spiral shaft (5), and another end of which includes a spiral groove (9) arranged thereon, the sleeve member (10) includes a tab (11) disposed on an inner wall thereof to correspond to the spiral groove (9), between the pillar (7) and the conveying channel (2) is defined a compression spring (35); the gathering system being connected to the outlet member (4).

2. The toilet used in outer space as claimed in claim 1, wherein the collecting system comprises a bag (12), a holding plate (13), an open and close member (14), a connecting piece (15), a case (16), and a driving mechanism (17), the holding plate (13) is disposed in the housing (1) and includes an aperture (18) mounted thereon to correspond to the outlet member (4), and an annular ring (19) fixed around the aperture (18) to fit a bag (12) for collecting the feces; the holding plate (13) includes two parallel straps (20) attached on two sides thereof respectively to assemble and remove the open and close member (14) to and from connecting piece (15), the connecting piece (15) is retained between the open and close member (14) and the holding plate (13); the driving mechanism (17) includes an electric machine (33) to actuate a gear to mesh with a rack, and includes a rack (34) installed therein and attached to an outer side surface of the open and close member (14); the case (16) is retained to the housing (1) to cover the holding plate (13) and the bag (12).

3. The toilet used in outer space as claimed in claim 2, wherein the housing (1) is comprised of a base (30), a front cover (31) and a rear cover (32), both of which are disposed on a top end of the base (30) to cover the gathering and the collecting systems, the inlet member (3) extends out of covered front and rear covers (31), (32), and the outlet member (4) faces to the covered front and rear covers (31), (32).

4. The toilet used in outer space as claimed in claim 3, wherein the spiral shaft (5) is a double-head spiral shaft.

5. The toilet used in outer space as claimed in claim 4, wherein the spiral shaft (5) includes a neck attached on a power input end thereof to move the spiral shaft (5) in the conveying channel (2).

6. The toilet used in outer space as claimed in claim 5, wherein a damping controlling system includes a pressure sensor (36) and a control chip (37), the pressure sensor (36) or a strain sensor is disposed on a bottom end of the spiral shaft (5) of the electric feeding mechanism to sense a pressure of the feces to the spiral shaft (5).

7. The toilet used in outer space as claimed in claim 5, wherein the covered front and rear covers (31), (32) includes a top lid (25) disposed on a top end thereof to cover the inlet member (3).

8. The toilet used in outer space as claimed in claim 7, wherein the case (16) includes two elastic fasteners (26) retained on two sides thereof individually, and the front and rear covers (31), (32) include two releasers (27) disposed thereon to remove the case (16).

9. The toilet used in outer space as claimed in claim 8, wherein the connecting piece (15) includes a raised resilient retainer (28) mounted on a surface thereof facing to a square orifice (29) of the open and close member (14).

10. The toilet used in outer space as claimed in claim 9, wherein assembled open and close member (14) and the connecting piece (15) are placed in a slot of the holding plate (13), the straps (20) are fixed along two sides of the slot to limit the assembled open and close member (14) and the connecting piece (15) disengage from the slot; or the assembled open and close member (14) and the connecting piece (15) can be placed to the holding plate (13).

11. The toilet used in outer space as claimed in claim 10, wherein the gathering system comprises a guiding cylinder (55), a speed decreasing machine (63), a speed decreasing machine (63), a control panel (59), a switch (61), and a power source (62), wherein the guiding cylinder (55) includes an inlet member (69) and an outlet member (66) disposed thereon, includes a spiral peg (67) placed therein, and a rear end of the spiral peg (67) is connected to the speed decreasing machine (63) via a power connector (64), the speed decreasing machine (63) is coupled to the power source (62) through the switch (61), and the switch (61) is fixed to the control panel (59).

12. The toilet used in outer space as claimed in claim 11, wherein the guiding cylinder (55) includes an expanding and retracting mechanism (100), and the expanding and retracting mechanism (100) is comprised of a silica gel film (51), an extending and retracting member (52), a steel sheet (53), a joint (56), a cam (57), and an expanding machine (58), the expanding machine (58) connects with the cam (57) through a speed lowering gear, the cam (57) couples with the one end of the steel sheet (53) via the joint (56), and another end of the steel sheets (53) are fixed with the silica gel film (51) through the extending and retracting member (52), and the silica gel film (51) couples with an end surface of the guiding cylinder (55) via a turning shank (54).

13. The toilet used in outer space as claimed in claim 12, wherein an amount of the extending and retracting member (52) is three, and the three extending and retracting members (52) are arranged apart from (120) degrees.

14. The toilet used in outer space as claimed in claim 12 or 13, wherein the extending and retracting member (52) includes a thermally sensitive resistance (68) disposed thereon.

15. The toilet used in outer space as claimed in claim 11, wherein an outlet of the guiding cylinder (55) includes a sensor (65) fixed thereon for detecting a color of the feces.

16. The toilet used in outer space as claimed in claim 11, wherein the control panel (59) includes a LCD display screen (60) connected thereon.

\* \* \* \* \*